VENDING MACHINES FOR DISPENSING FRESHLY BREWED BEVERAGES

Filed April 24, 1957 5 Sheets-Sheet 1

*INVENTOR:*
RICHARD J. MUELLER
*BY* Margolis, Johnston, Cook & Root
ATT'YS

VENDING MACHINES FOR DISPENSING FRESHLY BREWED BEVERAGES

Filed April 24, 1957 5 Sheets-Sheet 2

INVENTOR:
RICHARD J. MUELLER
BY Marzall, Johnston, Cook & Root
ATT'YS

VENDING MACHINES FOR DISPENSING FRESHLY BREWED BEVERAGES

INVENTOR:
RICHARD J. MUELLER
BY Marzall, Johnston, Cook & Root
ATT'YS

VENDING MACHINES FOR DISPENSING FRESHLY BREWED BEVERAGES

Filed April 24, 1957 5 Sheets-Sheet 4

*INVENTOR:*
RICHARD J. MUELLER
*BY* Margall, Johnston, Cook & Root
ATT'YS

Dec. 5, 1961 R. J. MUELLER 3,011,426

VENDING MACHINES FOR DISPENSING FRESHLY BREWED BEVERAGES

Filed April 24, 1957 5 Sheets-Sheet 5

INVENTOR:
RICHARD J. MUELLER
BY Marshall, Johnston, Cook & Root
ATT'YS 3,011,426
Patented Dec. 5, 1961

3,011,426

VENDING MACHINES FOR DISPENSING FRESHLY BREWED BEVERAGES

Richard J. Mueller, Franklin Park, Ill., assignor to Automatic Canteen Company of America, Inc., Chicago, Ill., a corporation of Delaware Filed Apr. 24, 1957, Ser. No. 654,730
9 Claims. (Cl. 99—283)

This invention, in general, relates to vending machines. More particularly, the invention relates to machines for automatically brewing and vending coffee.

One of the primary problems in the art of vending coffee in coin-operated vending machines has been the failure to consistently produce coffee having the taste and aroma of home-brewed coffee. The storage of large quantities of coffee in vending machine large storage tanks is unsatisfactory from a space standpoint, which is a critical factor in vending machines. Furthermore, it is necessary to heat the stored coffee to keep it hot, and the long period in which the body of coffee is heated tends toward development of strong, off-flavors. The use of "instant coffees," in which the powdered, water-soluble extracts of the coffee beans are mixed with hot water at the time of vending avoids, the aforementioned problems, but there is some reluctance to universal acceptance of "instant coffees" being equivalent in taste to home-brewed coffee.

The vending machine of this invention is designed to brew automatically small quantities of coffee. The brewed coffee is stored in a storage vessel from whence it is dispensed upon insertion of the necessary coin or coins. An important aspect of the present invention is that it requires only one storage vessel for the brewed coffee.

It is, therefore, an object of the present invention to provide a machine for brewing and vending coffee. Another object is to provide a vending machine wherein only a single storage vessel for the brewed coffee is necessary. A still further object is to provide automatic means for brewing and dispensing coffee, which means is compact in nature and may be readily fitted into a vending machine cabinet.

These and other objects may be achieved by the vending machine illustrated in the drawings wherein.

Figure 1:
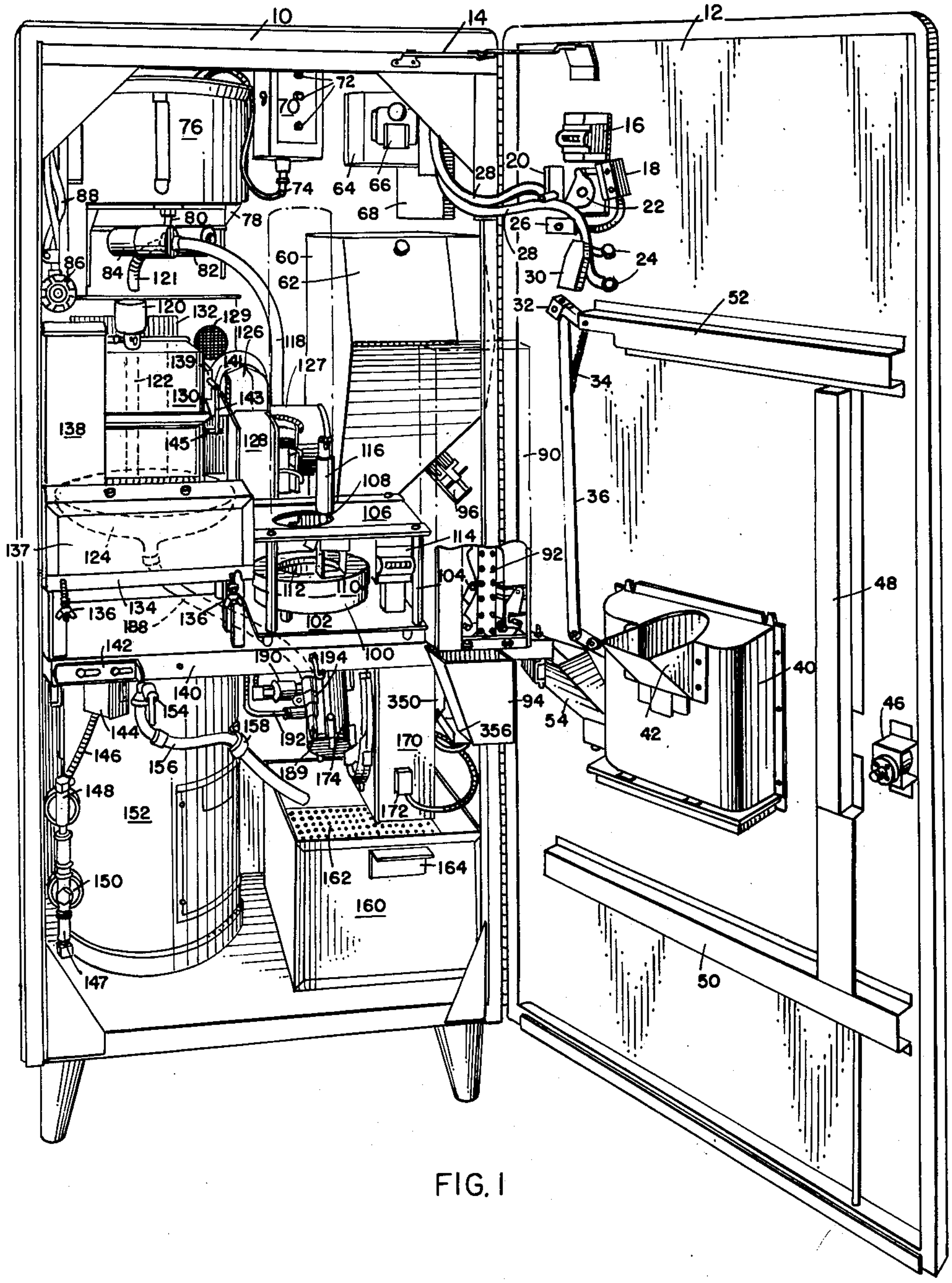
FIG. 1 is a perspective view of the vending machine with the door open.

The vending machine of the present invention comprises the cabinet 10 with its hinged door 12. A stop 14 limits the opening of the door. Mounted on the door 12 is a counter 16 which records the number of sales of hot chocolate. Selector micro switches 18 and 20 are actuated by a rotatable selector switch actuator 22. The switch actuator 22 is connected to a shaft extending through the door for selection of hot chocolate or the type of coffee to be dispensed.

An indicator on the other side of the door may be set to select black coffee, coffee with cream only, coffee with sugar only, coffee with cream and sugar or hot chocolate. Leads 24 are connected to buttons on the outside of the door which may be pushed to obtain extra cream or extra sugar. The selector switches 18 and 20 and the extra cream and extra sugar buttons 24 are connected to a control box through leads 28. A cycle-testing switch 26 is provided for testing the machine when it is serviced. A coin chute is provided at 30. The door also has mounted thereon a scavenger arm 32 for discharging a bent or otherwise distorted coin which will not pass into the coin mechanism. The scavenger arm 32 is actuated by toggle linkage 36 having spring 34 connected thereto. The toggle arm is actuated by rotating a handle on the opposite side of the door.

A vending stage 40 is also provided on the door. The vending stage has a cup chute 42, at the end of which is mounted a conventional device having an opening slightly smaller than the diameter of the cup so that the cup is frictionally held in the vending stage 40 to receive the dispensed liquid and from which the purchaser may remove the filled cup from an opening provided at the front side of the door 12. A door lock is provided at 46. The door 12 has thereon reenforcing rails 48, 50 and 52. A coin chute 54 returns rejected coins or change to the purchaser.

The foregoing portions of the machine are conventional parts. Further detailed description thereof is deemed unnecessary because the particular details do not comprise a part of the instant invention.

The interior of the cabinet 10 is provided with a ground coffee storage hopper 60 having a door 62. A control box is provided at 64 with a timing motor 66 mounted thereon. The timing motor drives a camming shaft (not shown) for actuating control switches for the dispensing cycle, described in detail hereafter. A panel for the various electrical controls is provided at 68. The wiring appearing thereon has been omitted in FIG. 1.

A relay control panel housing 70 is mounted at the top of cabinet 10. The housing 70 has three switches 72, a water inlet valve switch, a drain switch and a brew switch. A cable 74 leads from the housing to the electrodes in storage pot or vessel 76. The storage pot or vessel 76 rests on support 78 mounted on the cabinet walls and has central discharge line 80. The discharge line 80 is connected to a solenoid vending valve 82 or alternatively a solenoid drain valve 84. A rinse valve connected to a source of hot water is provided at 86 and is connected to flexible tubing 88 for rinsing out the storage pot during servicing of the machine.

A conventional coin mechanism is provided at 90 with a portion of the housing broken away to illustrate the coin mechanism 92. A coin chute 94 is mounted below the coin mechanism. This coin chute meets with the coin chute 54 mounted on the door. A solenoid agitator device 96 is mounted on the side of the hopper 60.

A cup-dispensing stage 100 is mounted next to the coin mechanism 92. The cup-dispensing stage 100 comprises a lower plate 102, corner rods 104, upper plate 106 with an aperture 108 therein and housing 110 with aperture 112 for the cup-releasing mechanism. A drive shaft 116 for a cup turret (not shown) extends through upper plate 106. The mechanism for actuating the cup turret and the cup-dispensing means is well known and has not been shown in detail. Any cup-dispensing means may be employed. A counter 114 for recording total sales is mounted in the cup-dispensing stage.

A drain line 118 is connected to the solenoid drain valve 84 and empties into waste tank 160. The solenoid vending valve 82 has a conduit 121 connected thereto. The conduit 121 discharges coffee into funnel 120, which, in turn, is connected to a tube 122, shown in phantom, which discharges into mixing bowl 124, shown in phantom.

The vending machine cabinet is provided with a blower 126 and blower motor 127 for removing steam from the cabinet 10. The blower discharges through a screen vent 129. A junction box is provided at 128. An air inlet duct is provided at 130 for admission of air into the cabinet through screen 132.

A slidable chassis 134 is mounted on the main slidable chassis 140. The chassis 134 is locked into position by locking nuts 136. In FIG. 1 the chassis 140 is illustrated in a forwardly-extending position to facilitate the illustration of the machine. The chassis 134 has mounted thereon motor housing 137 and a container for sugar 138. Two other containers similar to the container 138 have been removed to facilitate illustration of the invention. The motor housing 137 has mounted therein three motors (not shown) attached to augers which extend through the bottoms of the containers like those illustrated at 138. A flapper door (not shown) is provided at the rear opening of each container and opens whenever coffee is dispensed to open the container and permit dispensing of cream or sugar. The flapper doors are moved by energization of the solenoid 139 to rotate bell crank 143 through link 141. The bell crank 143, in turn, rotates shaft 145 having cam means thereon for opening the flapper doors. The details of the cream and sugar dispensing means do not comprise a part of the instant invention.

A hot water tank 152 is mounted at the rear of the cabinet 10. A thermostat unit 144 for electrical heating elements in the tank 152 is mounted on the hot water tank 152. A thermostat lead 146 is connected to junction box 128. The hot water tank 152 has a pressure and temperature relief valve 154 connected to a drain line 156 extending through support arm 158. A cold water inlet line is provided at 147. Said line has an inlet solenoid valve 148 and a pressure regulator valve 150.

A waste tank 160 having perforated plate 162 and handle 164 is mounted next to the hot water tank. This waste tank is provided for collection of water discharged through drain line 156 and for collection of coffee grounds discharged from the brewing apparatus, as well as discharge of coffee through drain line 118. The perforated plate 162 is adapted to support a cloth, which collects the coffee grounds and separates them from the liquid, which passes through the cloth.

The coffee and sugar, if any, is conducted from the mixing bowl 124 through the flexible tube 188 by gravity flow to a nozzle 189 which extends into the upper opening in the vending stage 40 when the door 12 is closed. The nozzle 189 has a T-branch 190 through which a measured amount of cream is fed into the nozzle during the dispensing cycle in the event the purchaser elects to have coffee with cream. The nozzle 189 also has another T-branch 192 which can be connected, if desired, to a source of chocolate syrup. The nozzle 189 has a bracket sleeve 194 by which it can be more rigidly mounted to the frame member of the machine if more rigid mounting is desired.

The coffee-brewing apparatus is mounted above the waste tank 160. It comprises a housing 170 and electrical plug 172. The plug 172 is connected to the contacts 176 (see FIG. 6).

Figure 6:
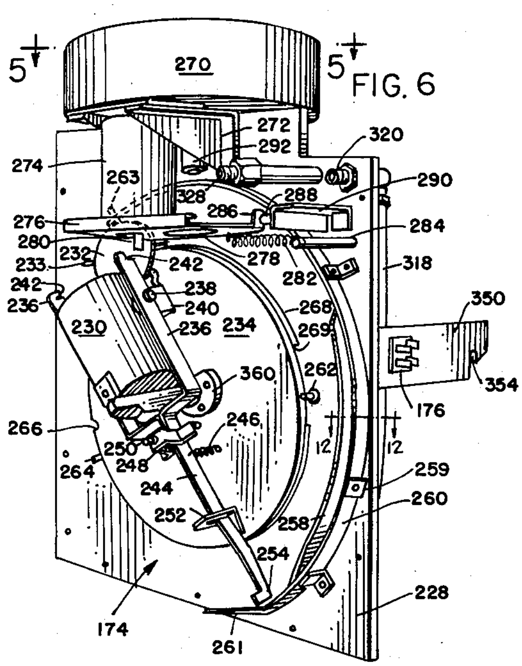
FIGS. 6 and 7 are perspective views of each side of the apparatus for automatically brewing coffee.
Figure 7:
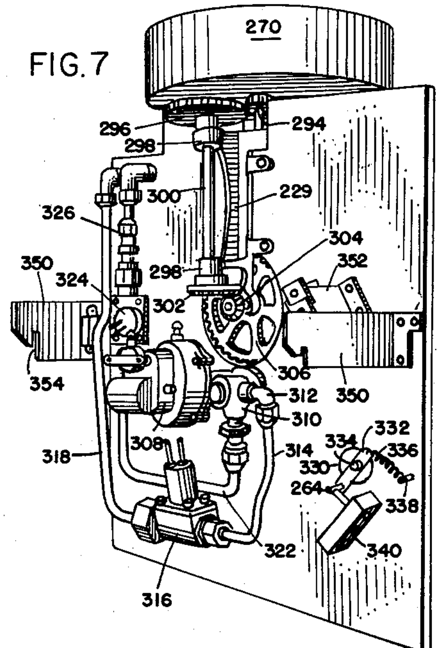
Figure 8:
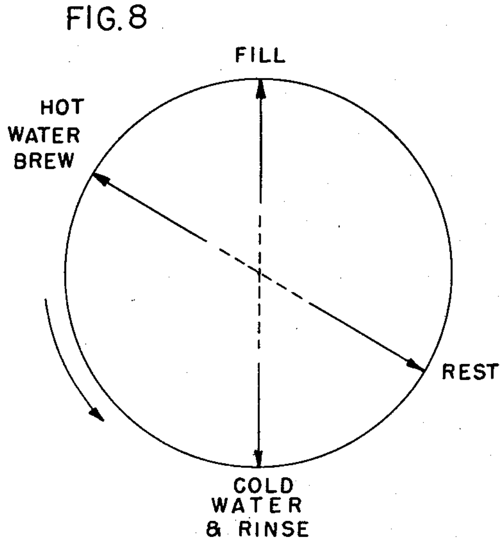
FIG. 8 is a schematic view of the various positions of the brewing vessel during the complete brewing cycle.
Figure 9:
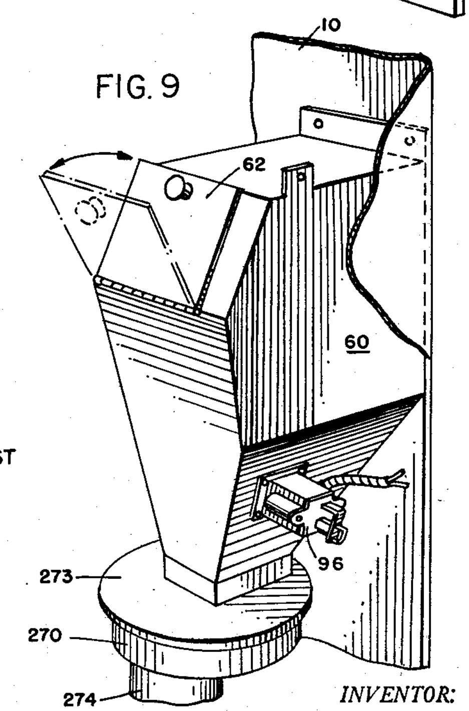
FIG. 9 is a perspective view of the ground coffee hopper and metering apparatus.
Figure 11:
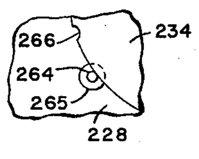
FIG. 11 is an enlarged, fragmentary front elevation of a portion of the apparatus for automatically brewing coffee illustrated in FIGS. 6 and 7.

The brewing apparatus is designated generally by the numeral 174 in FIG. 1. The details of the brewing apparatus 174 are shown in FIGS. 6 and 7. The brewing apparatus is mounted on mounting plate 228. It comprises a brewing vessel 230 having a hinged lid 232. A round, rotatable plate 234 is mounted on the mounting plate 228. A lever mechanism having arms 236 is pivoted about pins 238 in brackets 240 secured to the rotatable plate 234. The arms 236 have notched portions 242 which mesh with pins 233 extending from the sides of the lid 232. The arms 236 of the lever mechanism are integral with a camming member 244 of the lever mechanism. A tension spring 246 is fixed between camming member 244 and the plate 234. The camming member 244 extends through a U-bracket 248 having an adjustable set screw 250. The camming member 244 also extends through a slot in guide member 252. The outermost end of the camming member 244 comprises a follower portion 254. A cam plate 258 is mounted by rivet 259 on the arcuate strip 260. The camming plate 258 contacts the follower portion 254 of the lever mechanism as it rotates to pivot it into locking position with respect to the pins of the brewing vessel lid 232.

Figure 12:
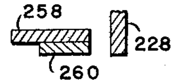
FIG. 12 is an enlarged, cross-sectional view taken on section 12—12 of FIG. 6.

Also mounted on the plate 228 is an arcuate strip 260 having an end portion 261 extending diagonally away from the plate. The arcuate strip 260 and cam plate 258 are spaced away from the plate 228 a sufficient distance (see FIG. 12) to permit pin 263 on the brewing vessel lid 232 to pass between them and the plate 228. The arcuate strip 260 terminates at a point shown in phantom in FIG. 6.

A movable pin 262 extends through an aperture in the plate 228 and rides on the rounded edge of the rotatable plate 234. This pin serves to actuate a switch for a purpose later described. A similar pin 264 extends through aperture 265 in the plate 228 and is similarly connected to a switch in an electrical circuit later described. The pins 262 and 264 are engageable with an arcuate camming notch 266 in the rounded edge of the rotatable plate 234. When the camming notch 266 engages the pin 262, rotation of the plate 234 is stopped with the vessel in a home position. When the camming notch 266 engages the pin 264, rotation is stopped with the apparatus in a brewing position.

An annular ring 268 is secured to the back face of the rotatable plate 234. The annular ring 268 has a recessed portion 269. The function of the annular ring 268 is the closing and opening of a switch which actuates a solenoid valve in the cold water line. The switch (not shown) has a spring-pressed contact button in contact with the annular ring. When the contact button is aligned with the recess 269, the button is moved into the recess and closes a switch in the solenoid valve circuit. The switch is positioned to provide a short rinse period with the brewing vessel in an inverted position while the brewing vessel is rotating toward home position.

Figure 5:
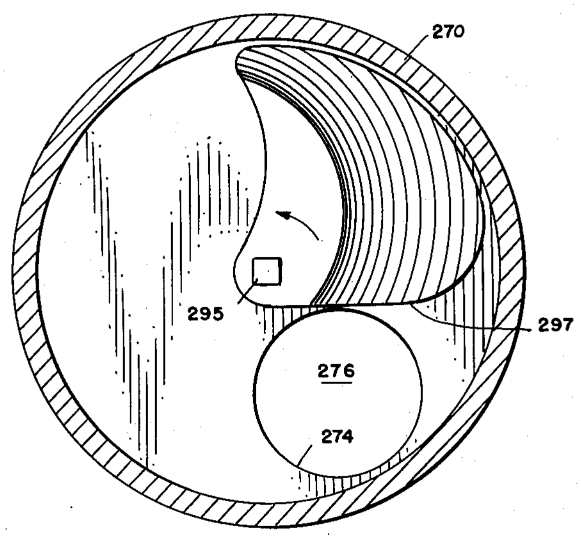
FIG. 5 is a cross-sectional view of a device for metering a given quantity of coffee grounds.

A coffee-grounds receiving chamber 270 is mounted on the plate 228 by mounting brackets 272. The receiving chamber 270 has a lid 273 with an aperture therein through which the bottom open end of the coffee hopper 60 stands. A metering chamber 274 opens into (see FIG. 5) and depends from the receiving chamber 270. The metering chamber 274 has a volume equal to the volume of coffee to be dispensed into the brewing vessel 230. The metering chamber 274 has a peripheral flange on the lower end and the plate valve 276 is slidably mounted on the flange. The plate valve 276 has an aperture 278 which is normally out of engagement with the bottom opening of the metering chamber 274 as shown in FIG. 6. The plate valve 276 has a depending tab 280 aligned with the upper portion of the arms 236 and adapted to engage said arms as they are rotated with the brewing vessel. The plate valve 276 is urged to a normally closed position by tension spring 282 connected at one end to said valve and at the other end to rod 284 mounted on the plate 228. Movement of the plate valve 276 and spring 282 is limited by the upwardly-extending tongue 286 of the valve which abuts against bumper member 288 on bracket 290, the latter being mounted on the plate 228.

A bearing 292 for the shaft of gear 294 is mounted on the plate 228. The gear 294 drives a shaft 295 (see FIG. 5) on which is mounted a pusher 297 which moves the coffee grounds in the receiving chamber 270 into the metering chamber 274 as the pusher rotates.

Referring now to FIG. 7, the gear 294 is driven by gear 296. Gear 296, in turn, is driven by a shaft 300 journalled in bearings 298 on the T-bracket 229 through bevel gears 302 and 304, the latter being mounted on a common shaft with gear 306 which, in turn, is driven by a gear (not shown) on the shaft of motor 308. The latter gear is mounted between the plate 228 and the rotatable plate 234.

A water manifold 310 is provided on the rear face of the brewing apparatus. The manifold 310 has an elbow 312 connected thereto which is connected on the opposite end to a hot water supply line 314 connected to hot water solenoid valve 316 and hot water supply line 318. This valve 316 has a flow control regulator and is of the type described in U.S. Patent No. 2,454,929 or No. 2,500,750, in which the aperture decreases in size in response to an increase in line pressure and increases in size in response to a decrease in line pressure—thereby providing a substantially constant rate of flow in the water lines of the machine regardless of main pressure. The latter line is connected with a supply line from the hot water heater by threaded connection 320 on the front side of the brewing apparatus.

The manifold 310 is also connected to a cold water supply line 322 having a cold water solenoid valve 324 communicating with conduit 326, having a threaded portion 328 on the front side of the brewing apparatus adapted to be connected with the cold water supply line 148.

The brew cycle switch pin 264 extends through an opening 265 in plate 228 substantially larger than the pin to permit lateral movement of the pin in the plate when it engages the notch 266 and is mounted on an arm 332 pivoted at 334. A washer 330 is mounted between the arm 332 and the plate 228. The arm 322 is connected at the opposite end to a tension spring 336 mounted on a pin 338 in the plate. When the pin 264 engages the notch 266 of the rotatable plate 234 the tension spring urges the pin into the notch and closes brew microswitch 340. The full cycle switch actuated by pin 262 is hidden by motor 308 in FIG. 7, but its structure is exactly the same as that shown with respect to the brew cycle switch 340.

Mounting plate 228 has brackets 350 mounted thereon. On one of these brackets 350 is mounted a mounting bracket 352 for the rinse switch (not shown). The mounting brackets 350 have notches 354 for removably mounting the brewing apparatus on channel 356 secured to one wall of the cabinet 10.

Figure 4:
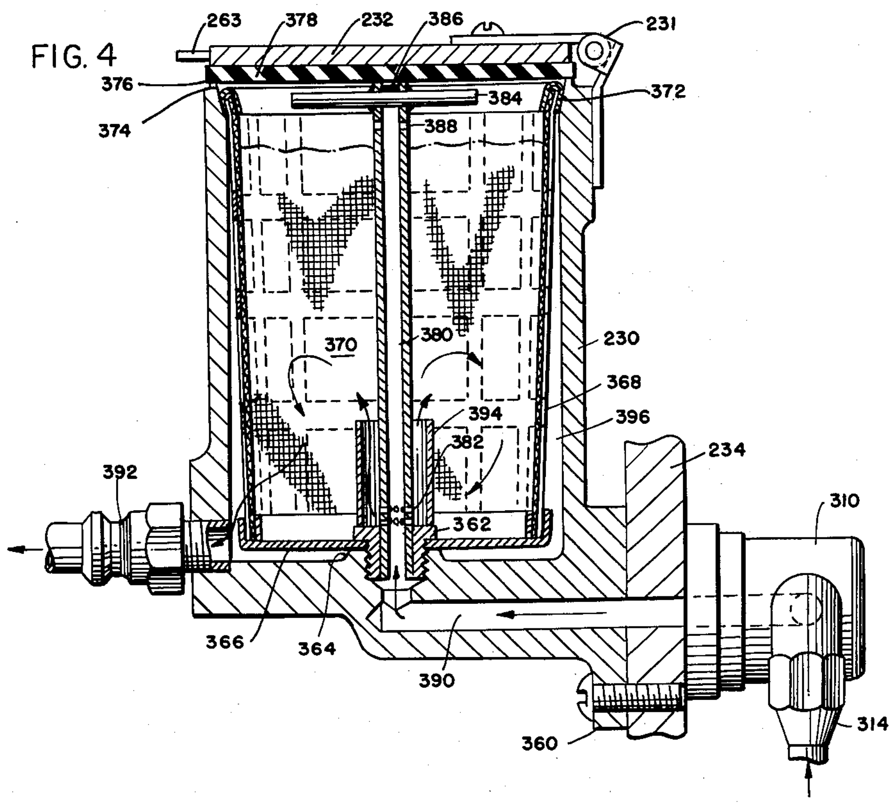
FIG. 4 is a cross-sectional view of a coffee brewing vessel which may be used in the machines of this invention.

A brewing apparatus which may be employed in the vending machine of the instant invention is illustrated in FIG. 4. This brewing apparatus is the subject of my copending application, filed on January 11, 1957, Serial No. 633,799, now U.S. Patent No. 2,911,902, issued November 10, 1959. Referring to FIG. 4, the brewing apparatus comprises a brewing vessel 230 having a hinge 231 for lid 232. The brewing vessel 230 has an integral mounting plate 360 connected to a rotatable base plate 234. A leakproof swivel connection between manifold member 310 and base plate 234 is provided at the opposite side of said base plate, said manifold member 310 being connected to a hot water supply line 314 and the cold water supply line 322. (See FIG. 7.)

A flanged nipple 362 is threaded at the bottom of the brewing vessel 230 on raised portion 364. A base 366 of a foraminous container is held in position in the brewing vessel by the flanged nipple 362. The foraminous container comprises a supporting frame 368 for wire screen or other foraminous material 370. The rim of said container is a U-shaped metal ring 372 folded about the edge of the wire screen 370 and frame 368 and has an outward flare. The flaring ring 372 rests on an annular flaring inner wall portion 374 of the brewing vessel 230, providing an effective seal between the foraminous container and the inner wall of the brewing vessel 230. The upper wall of the brewing vessel 230 terminates in a relatively sharp edge 376 upon which rubber gasket 378 rests when the lid is in a closed position to seal the brewing vessel against leakage.

Central tube 380 is press-fitted in the nipple 362. The tube 380 has apertures 382 just above the surface of the flanged portion of the nipple 362. A handle 384 extends through and is secured in the central tube 380 at the opposite, closed end 386. Apertures 388 are also provided at the opposite end of said tube.

The liquid is supplied to the apparatus through supply passage 390 which connects the tube 380 with the hot water supply conduit 314. After the liquid has passed through the coffee grounds in the foraminous container, it is discharged into discharge conduit 392, which has a swivel joint therein.

An open-ended cylindrical baffle or sleeve 394 surrounds the tube 380 and has an internal diameter substantially larger than the outer diameter of tube 380. The cylindrical baffle 394 is loosely mounted so that it slides up and down around the tube 380 for a purpose described hereinafter.

The apparatus is assembled by placing the foraminous basket in the brewing vessel 230. The flaring ring 372 against the flaring portion 374 of the inner wall of the brewing vessel 230 provides a seal against escape of coffee grounds into space 396. The foraminous container is shaped to provide an annular space 396 between the container and the inner walls of the brewing vessel 230. The basket is held in this position by threading the flanged nipple 362 into the bottom of the brewing vessel 230 by rotating the handle 384 of the tube 380.

When the lid is closed, hot water is supplied through conduit 314 and passage 390 into the central tube 380. The hot water passes mainly through apertures 382 of the tube 380 and is deflected upwardly by the cylindrical baffle 394. A small amount of water is discharged through apertures 388. The streams from apertures 388, at the relatively low rate of flow during the brewing cycle, drop on the surface of the ground coffee—permeating through the upper portion of the body of the ground coffee. The hot water circulates through the body of ground coffee and then passes through the wire screen 370 into the annular space 396. The coffee produced by the contact of the hot water and the ground coffee is discharged through discharge conduit 392 to storage vessel 76.

After the brewing cycle is complete the hot water is shut off and the base plate 234 is rotated to invert the brewing vessel 230 for discharge of the coffee grounds. With the lid 232 open and the brewing vessel in an inverted position the loosely mounted baffle 394 falls to the opposite end of the central tube 380 as the main body of coffee grounds falls out of the container. Cold washing water is then supplied through supply conduit 322 and supply passage 390 into the central tube 380. The major portion of the washing water is discharged through apertures 382. As the water and grounds pass down the screen 370, they wash off most of the remaining grounds clinging to the screen. The streams of water emitting from apertures 388 remove any coffee grounds wedged between the cylindrical baffle 394 and the tube 380. If these grounds are not removed, they may prevent the cylindrical baffle 394 from falling back into position for the next brewing cycle.

The brewer herein described is eminently suitable for automatic brewing of coffee in relatively small quantities, e.g., 10-cup or 20-cup quantities. In an automatic operation, the empty apparatus with the lid held open by pin 263 and strip 260 is rotated by the rotatable plate 234 to a substantially vertical position, at which point metering chamber 274 containing ground coffee is opened by actuation of plate valve through engagement of the first arm 236 and member 280 as the brewing vessel rotates, and a measured quantity of ground coffee is discharged into the foraminous container of the brewing vessel. The lid 232 is released by rotation of the pin 263 beyond the end of strip 260 where it falls by gravity. If necessary, a cam member or other suitable device may be mounted on plate 228 just beyond the end of strip 260 to move the lid 232 so that it falls closed. As the brewing apparatus continues to rotate, the follower portion 254 of camming member 244 engages cam plate 258 and locks the lid tightly by pivoting notches 242 into engagement with lid pins 233. A quantity of hot water is then admitted and circulated through the ground coffee for a predetermined time. At the completion of the brewing cycle the flow of hot water is stopped, and rotation of the brewing vessel is continued. As the vessel rotates the lid is held closed for a short period to allow any built up pressure to be gradually released. The lid is then released and falls open as the brewing vessel approaches an inverted position. During the rotation toward an inverted position of the brewing vessel, the moist coffee grounds are discharped, and washing water is discharged with the vessel in an inverted position as described above. The brewing vessel is then stopped in a rest position and is ready for another cycle.

*Electrical circuit and operation of machine*

Figure 10:
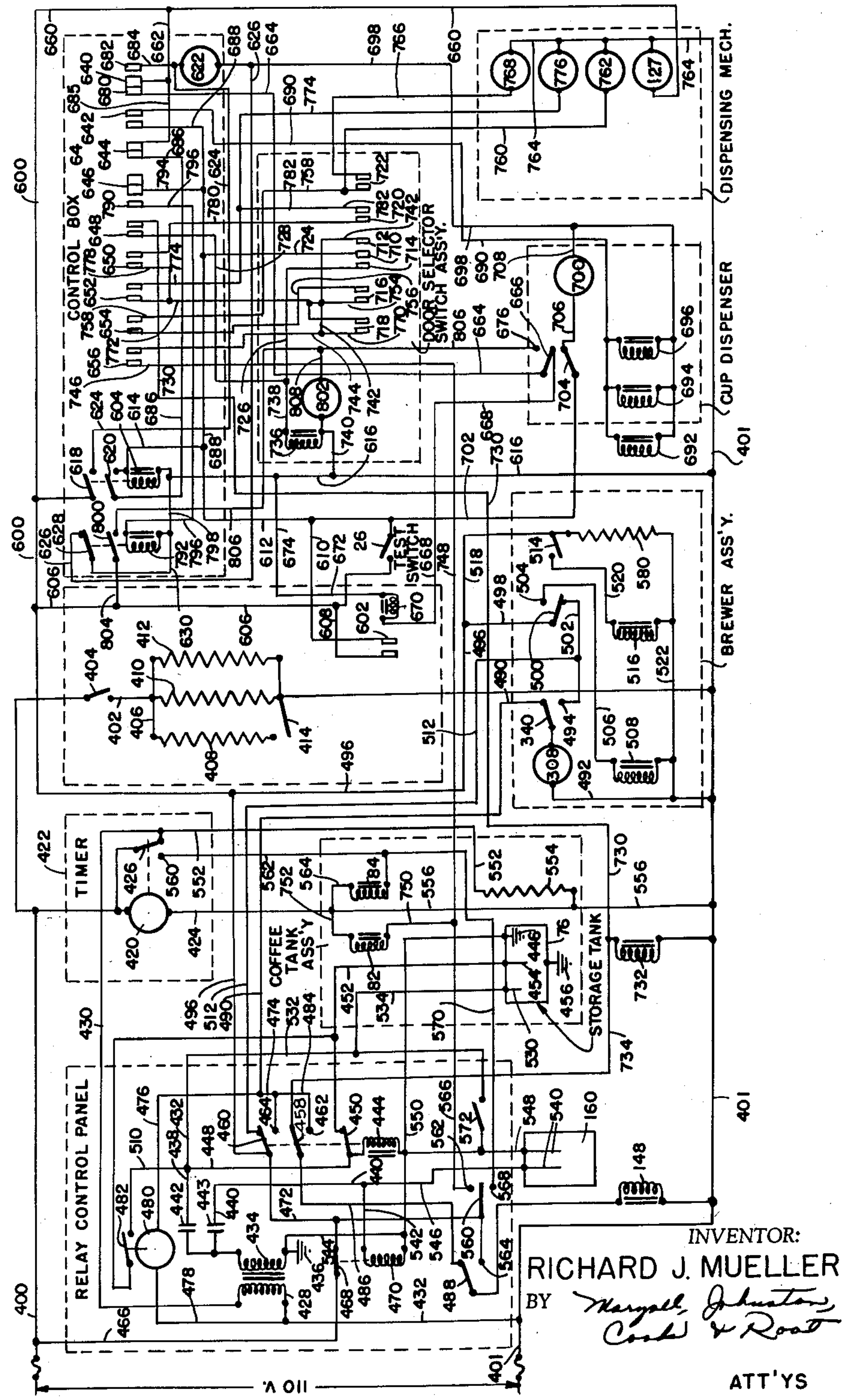
FIG. 10 is a diagram of the electrical circuits of the machine.

The electrical circuit for the vending machine is illustrated in FIG. 10. The circuits are described hereafter in conjunction with the operation of the machine. The circuits of the vending machines are connected through conductors 400 and 401 to a suitable supply source. An electrical heating element in the hot water tank 152 is connected across the power source by conductor 402 having a thermostatic control switch 404 of the thermostat unit 144. The heating element 406 comprises three high resistance elements 408, 410 and 412. In one suitable combination, the heating element 410 is rated at 1250 watts and element 412 at 600 watts. The third element 408 is rated at 600 watts and is provided with a jumper connection 414 for connecting heating element 408 in the circuit. Under the ordinary situation the two elements 410 and 412 are adequate, but in machines having a high volume it may be necessary to connect the jumper 414 in order to provide sufficiently rapid heating of the water.

A clock motor 420 of a timer 422 is connected across the power source by conductor 424. The timer is a conventional timer of the seven-day type having a switch 426 operated by the clock motor. The switch 426 turns the machine on at preset times and shuts down the machine at nonvending times, e.g., at night and during weekends. When the machine is turned on, the switch 426 is in the position shown in the drawing. In this position the primary 428 of a transformer is energized through conductors 430 and 432. The transformer is a step-up transformer—the voltage in the secondary being stepped up to about 135 volts. The secondary 434 is grounded at 436. The opposite side of the secondary 434 is connected to conductors 438 and 440 having condensers 442, 443.

The transformer supplies power to an unique, isolated brewing control circuit. A brew relay solenoid 444 is connected at one side to conductor 438 by conductor 448 and on the other side to ground at 446. The condenser 442 in conductor 438 has a reactance substantially equal (plus or minus 10%) of the impedance of the brew relay solenoid 444. Conductor 448 leads from conductor 438 through switch 450 of the brew relay. The switch 450, in turn, is connected through conductor 452 to level control electrode 454 of coffee storage tank 76. The storage tank is grounded at 456.

The electrode control system of the storage tank 76 comprises a single electrode 454. The electrode 454 is connected to ground only when the liquid level in the storage tank 76 is sufficiently high to contact said electrode.

With the storage tank 76 empty and at the time the clock motor closes the brewing circuit the solenoid of the brew relay 444 is energized—the solenoid being connected through ground to the ground side of the secondary of the isolation transformer 434. Upon energization of the brew relay 444, switch 450 is opened and relay switches 458 and 460 are moved into contact with switch poles 462 and 464. This closes a circuit through switch 460, comprising conductor 466 having a normally closed solenoid switch 468 actuated by waste tank relay 470 in a manner hereinafter described. The conductor 466 is connected to conductor 472 and through switch 460 to conductor 474. Current through conductors 476 and 478 energizes timer motor 480 operatively connected to close switch 482 at a predetermined time. Switch 482 remains open during most of the brewing cycle and is closed momentarily only at the end of the cycle.

Energization of the solenoid of the brew relay 444 also closes a circuit through relay switch 460, comprising conductor 484, relay switch 458, conductor 486 having a manually-operated water inlet valve switch 488 normally positioned as illustrated and cold water inlet solenoid valve 148 to allow for replenishment of water drawn off the hot water tank during the brewing cycle. The water system is operated at main pressure.

Simultaneously with the energization of the timer motor 480, motor 308 for rotating the brewing assembly 174 is energized through conductor 490, full cycle switch 340 and conductor 492. As the plate 234 with the brewing assembly thereon begins to rotate, the full cycle switch 340 is moved into contact with pole 494. Continued energization of motor 308 is accomplished by current through conductors 496 and 498, brew switch 500 which is normally in the position shown in the drawing, conductor 502 and switch 340 now contacting pole 494.

As the brewing apparatus rotates in a counterclockwise direction as viewed in FIG. 6, the leading arm 236 of the lever mechanism engages tongue 280 of plate valve 276 on the metering chamber 274 and moves the plate valve opening 278 into alignment with the metering chamber 274. A measured quantity of ground coffee (the volume in the metering chamber) drops into the brewing vessel 230 as it passes under the metering chamber 274. The brewing vessel continues to rotate, and after the pin 263 of lid 232 passes beyond the uppermost end of arcuate strip 260, the lid falls closed. It may be necessary to provide a cam or spring loaded impeller at this point to move the lid across dead center so that it falls closed. As the vessel 230 continues to rotate, the follower portion 254 of the lever mechanism contacts the camming plate 258, and the notches 242 of arms 236 are moved into locking engagement with pins 233 of lid 232 to seal the brewing vessel.

During the rotation of the brewing assembly, the gear assembly 294—306 is actuated and rotates the square shaft 295 connected to gear 294. This rotates pusher 297 in coffee receiving chamber to push coffee grounds from the side of the receiving chamber 273 on which the hopper 60 discharges the grounds to the opposite side wherein the metering chamber 274 is filled and leveled off. The gear assembly has a gear ratio to give one complete rotation of the pusher 297 per rotation of the brewing assembly.

The brewing mechanism on plate 234 continues to rotate through energization of motor 308 until the recess 266 allows the actuator rod 264 to move the brew switch into contact with pole 504. Brew switch 500 then closes the circuit comprising conductor 506 and hot water solenoid valve 508. This opens the hot water line into the brewing vessel 230 where it flows through the coffee grounds and the brewed coffee flows into the storage tank 76.

The switch 482 of the timer motor 480 is set to allow for the time for rotation of the brewing apparatus from rest position to the brewing position with the lid closed. The timer switch remains open for an additional time, the time allowed for brewing of the coffee. In the cycle illustrated in FIG. 10 this brewing time is 1 minute, 25 seconds. After the allotted brewing time the timer 480 closes switch 482. Closing of the switch 482 connects electrode 454 through ground 456, via the coffee or other liquid in the storage tank with the ground side 436 of the secondary 434 of the isolation transformer. At this stage both the brew relay 444 and the electrode 454 through conduits 510, switch 482, conduit 452 and the liquid in the storage tank contacting the electrode 454 are both connected in parallel to the ground side 436 of the secondary 434 of the isolation transformer. Because the brew relay circuit has more resistance to electron flow due to inductance of the brew relay, current flow is through the electrode circuit—thus deenergizing the brew relay and returning the relay switches to the position illustrated in the drawing. Return of the switch 460 to its original position energizes the circuit of the motor 308 through conductor 512 and the switch 340 contacting pole 494. Rotation of the plate 234 and brewing apparatus is resumed, brew switch 500 returning to the position shown in the drawing. As rotation continues the lid 232 is held closed for a short period to allow any pressure in vessel 230 to drop and is released when follower portion 254 passes the end of cam plate 258. The lid falls open by gravity, and the coffee grounds are discharged into the waste tank 160 by gravity.

When the brew switch 500 returns to its original position as the plate 234 resumes rotation, current to the motor 308 is also supplied through line 496, switch 500 and conductor 502. When the brewing vessel 230 has reached a substantially inverted position the spring-pressed rinse valve switch plunger (not shown) is pressed into the recess 269. This closes the rinse switch 514 and energizes solenoid 516 of rinse valve 324 in the cold water supply line through conductor 518, switch 514, conductors 520 and 522. Rotation of the plate 234 and brewing apparatus continues until the recess 266 permits the actuator rod 262 to move—thus returning the switch 340 to the position illustrated in the drawing. This breaks the circuit of the motor 308 and rotation of the plate 234 and the brewing mechanism is stopped.

While the liquid in the storage tank 76 is at a level so that it contacts electrode 454, current flow through the capacitor 442 in line 438 continues to the ground side 436 of the secondary 434 because of lesser resistance than flow through the brew relay. However, once the liquid level drops below the electrode 454, the brew relay is actuated and the cycle previously described is repeated.

The storage tank 76 is provided with a safety electrode 530, shorter than the electrode 454, which will deenergize the brew relay and prevent overflow of the storage tank 76 in the event of malfunction of the timer 480 or some other component of the circuit. If the liquid level in the storage tank reaches the level of the safety electrode 530, it connects the ungrounded side of transformer 434 through capacitor 442, conductor 532 and conductor 534 with the ground side of the isolation transformer 436 through the grounded storage tank at 456. This path of current flow having less resistance than flow through the brew relay, the brew relay is deenergized, returning switches 450, 458 and 460 to the position shown in the drawing.

Another safety feature of the present invention involves the provision of dual electrodes in the waste tank 160. This circuit is designed to stop any further brewing cycles in the event that the liquid level in the waste tank 160 rises above a predetermined point and thus prevents overflow of the waste tank. The waste tank relay 470 is normally energized through conductors 440, 542 and 544, the latter connected to the ground side 436 of the secondary 434 of the isolation transformer. When the liquid level in the waste tank 160 reaches the electrodes 540, the relay 470 is shorted out—the current flowing from conductor 440 through conductor 546, across the electrodes, through conductor 548 and conductor 550 back to the ground side of the isolation transformer via ground connection 446. This deenergizes relay 470 in the same manner as described above for the brew relay and opens the switch 468 of the waste tank relay to prevent further operation of the brew relay to start an additional brewing cycle. The condenser 442 in conductor 440 has a reactance substantially equal ($\pm 10\%$) to the impedance of the solenoid of the waste tank relay 470.

When the vending machine is not shut off by 24-hour timer, the storage tank heater for keeping the coffee hot in the storage tank is energized through conductor 552, heating element 554 and conductor 556.

At the close of the working day, the clock motor 420 moves switch 426 into contact with pole 560. This energizes the solenoid of the drain valve 84 through conductors 562, 564, 566 and 556—thereby draining the storage tank 76 of any remaining liquid.

If the machine is serviced, the solenoid of the vending valve 82 may be energized by moving the throw of the single throw, double pole service switch 560, which is normally open as shown in the drawing, into contact with pole 562. This completes the circuit through the solenoid of the vending valve 82. By moving switch 560 into contact with pole 568, the circuit is completed through solenoid drain valve 84 so that the storage vessel 76 may be drained by the serviceman. If the machine is serviced during the vending period the normally open switch 572 may be closed—thereby preventing operation of the brew relay during the servicing of the machine.

Service switch 488 is normally in the position shown in the drawing. When it is moved into contact with pole 564, the water inlet solenoid valve 148 is energized to open the water line and permit the serviceman to rinse the storage vessel. A heater 580 is connected across conductors 518 and 522. This heater serves to keep the brewing apparatus warm.

The vending circuit, in general, comprises a coin control circuit actuated by the depositing of a coin in the machine, a vending control panel, a selector switch assembly for selecting chocolate or coffee—black or with cream and/or sugar, a cup dispenser assembly and a coffee hopper agitator. The coin actuated portion of the circuit has been illustrated with only one coin actuated switch. The details of the circuit for providing for the use of a multiple number of coins and the return of proper change to the purchaser have been omitted. The coin changer circuit is a conventional circuit and does not comprise a part of the instant invention.

The vending circuit comprises the conductor 600 connected with conductor 496, which, in turn, is connected to one side of the power supply through the normally closed waste tank relay 468. Upon depositing a coin in coin switch 602 a master relay 604 is connected across the power supply through conductors 606, 608, 610, 612, 614 and 616. When the solenoid 604 of the master relay is energized, switches 618 and 620 are closed. Upon closing of switch 618 timer motor 622 is connected across the power source through conductors 624, 626, relay switch 628 of an antijackpot relay, which switch is normally closed, and conductors 630 and 616.

The timer motor 622 has connected thereto a shaft rotatable with the motor. The shaft has cams mounted thereon which open and close switches at the desired time as the shaft rotates with the timer motor 622 through one complete cycle. The switches comprise a timer motor cycle switch and coin lock control switch 640, a cup vending switch 642, a master relay control switch 644, an antijackpot control switch 646, a chocolate control switch 648, an extra cream switch 650, a cream switch 652, a sugar switch 654 and coffee vending switch 656. The switch 640 is a single throw, double pole switch with the contact normally in the position shown in the drawing. In this position the power supply line 600 is connected through conductors 660, 662, switch 640, conductor 664, switch 666, conductor 668 through coin lock coil 670 and conductors 672, 674 and 616 to the other side of the power supply. This energizes the coin lock coil 670 and permits the machine to accept a coin deposited therein. When the circuit is broken by the switch 640, the coil is deenergized and a coin deflector bar enters the coin chute and deflects it back to the person who deposited the coin in the machine. When the machine contains cups the switch 666 is in position shown in the drawing, and when the cups are exhausted the switch 666 is automatically moved to the pole 676—thus also opening the coin lock coil 670 circuit and returning any deposited coins.

Immediately after the timer motor 622 and shaft begin to rotate the circuit through contact 680 is broken—thus moving the previously described bar into the coin chute and returning any coins to the depositor during the vending cycle. When the circuit through contact 680 is broken the switch closes the circuit through contact 682 and thereby provides a path of electrical energy to the timer motor 622, independent of the circuit through master relay control switch 618, via conductors 660, 662, 684, 626, the normally closed antijackpot relay control switch 628 and conductor 630 and 616.

Immediately thereafter the normally opened cup vending switch 642 closes the circuit for dispensing a cup into a position for receiving the liquid to be dispensed. The cup vending mechanism is connected across the power source through conductors 660, 662, 685, the normally closed master relay cnotrol switch 644, conductor 686, the now closed master relay switch 620, conductors 614, 688 through the closed cup vending switch 642, conductor 690, the cup drop solenoid 694 of the cup dropping mechanism and counter solenoid 696, thence through conductors 698, 626, normally closed antijackpot relay switch 628, conductors 630 and 616 to the opposite side of the power source. The turret motor 700 is energized upon the closing of the coin switch 602 through conductors 606, 608, coin switch 602, conductors 610, 702, normally closed turret switch 704, conductors 706, 708, 698, 626, normally closed antijackpot relay switch 628 and conductors 630 and 616.

Shortly after the cup drop switch is closed the chocolate switch 648 and coffee switch 656 are closed. The machine will dispense coffee or hot chocolate, depending upon the selection by the purchaser.

Prior to depositing the coin the purchaser has made his selection by moving an indicator on the outside of the door of the vending machine to the particular beverage which he desires. The door selector switch assembly comprises a single throw, double pole switch 710 with coffee contact 712 and chocolate contact 714. Additional switches are sugar switch 716, cream switch 718—all of which may be closed by movement of the indicator member on the door. Two additional buttons are provided on the door for closing extra cream switch 720 and extra sugar switch 722.

If the circuit across the chocolate selector switch contact 714 has been closed, closing of the chocolate control switch 648 energizes (through master relay control switch 644 and master relay switch 620, conductors 614, 688, 724, selector switch 710, conductors 726, 728, chocolate control switch 648, conductor 730) the solenoid 732 of the solenoid valve in the hot cholocate hot water supply line to open said valve for a period of time while the switch 648 is closed. At the same time the solenoid 148 of the cold water inlet valve is energized and the valve is opened through conductor 734, brew relay switch 458, conductor 486 and switch 488. When both the cold water inlet valve and the chocolate hot water valve are opened, hot water is dispensed through the hot chocolate line under main pressure. Chocolate is drawn into said hot water supply line by a venturi type of feed into said line (not shown). When the chocolate selector switch 710 is closed the chocolate counter solenoid 736 is energized through conductors 738, 740 and 616. The counter is of the type well known in the art, having a ratchet and pawl mechanism which is moved upon energization of the solenoid of the counter.

If the single throw, double pole switch 710 is moved into contact with coffee selector contact 712, a circuit is closed during the coffee vending period through the master relay control switch 644 and master relay switch 620, as previously described with respect to the chocolate vending cycle, up to contact 712, from whence the completed circuit is through conductor 742, 744, coffee control switch 656, conductor 746, 748, 750, a solenoid 82 of the solenoid valve in the coffee vending line and conductors 752 and 556. Energization of the solenoid 82 of the coffee vending valve opens the coffee vending line from the coffee storage tank 76 and permits the coffee to be discharged under gravitational flow.

As the timer motor 622 further rotates, the extra cream switch 650, cream switch 652 and sugar control switch 654 are closed immediately after the coffee switch 656 is closed. If the sugar selector switch 716 has been closed sugar dispensing is started through a circuit coming off of coffee selector contact 712, conductor 742 through conductor 754, closed sugar selector switch 716, conductor 756, sugar control switch 654, conductors 758, 760, sugar dispensing motor 762 which drives the auger for dispensing powdered sugar and conductor 764 to the opposite side of the power source. If the extra sugar button 722 is held closed by the purchaser during the vending cycle a circuit is completed off conductor 758 through the extra sugar button 722, conductor 766, extra sugar motor 768 and conductor 764. This circuit enables the purchaser to obtain approximately twice the quantity of sugar normally vended by the machine.

If the purchaser in his selection has closed cream selector switch 718, the cream dispensing circuit is energized off coffee selector contact 712, conductor 742, conductor 770 through closed cream selector switch 718, conductor 772 through cream control switch 652, conductor 774 to energize the powdered cream vending motor 776. If the purchaser desires an extra amount of cream above that normally vended by the machine he may push the extra cream button during the vending cycle and hold extra cream switch 720 closed. In this instance a circuit is completed through the cream vending motor through the cream selector switch 718 as previously described, conductors 772, 778, extra cream control switch 650, conductor 780 through extra cream switch 720, conductor 782, conductor 774 through cream vending motor 776 and conductor 764. The cam for extra cream control switch 650 is placed on the shaft of the timer motor 622 so that it closes at about the time the cream control switch 652 opens—thus keeping the cream vending motor 776 energized for an additional period of time.

If liquid cream and sugar syrup are dispensed instead of the powdered cream and granular sugar, solenoid valves in the dispensing lines for the liquid cream and sugar syrup may be substituted for the sugar and cream motors in the wiring diagram of FIGURE 10.

As the shaft continues to rotate with the timer motor 622, extra cream control switch 650, sugar switch 654 and coffee switch 656 are opened, cream control switch 652 having opened previously. This deenergizes the actual vending circuits and vending of the liquid is stopped. At about a ¾ revolution of the shaft of the timer motor 622 the master relay switch 644 is opened momentarily. This deenergizes the solenoid 604 of the master relay and resets the relay—opening switches 618 and 620. The timer motor cycle switch 640 is still closed and the timer motor remains energized through the circuit of which timer motor cycle switch 640 and contact 682 are a part. Immediately after the master relay switch 644 has been momentarily opened the antijackpot control switch 646 is moved into contact with switch pole 790. The antijackpot control switch and the antijackpot relay 792 are employed to check the vending circuit to be certain the master relay 604 has been deenergized and switches 618 and 620 opened and to prevent continued vending by the machine without the deposition of an additional coin. If the master relay 604 remains energized for some failure in the circuit, master relay switches 618 and 620 would remain closed and the timer motor would remain energized and go through another vending cycle.

If the master relay 604 circuit remains energized, movement of the antijackpot switch 646 into contact with switch pole 790 closes a circuit off the master relay switch 620 through conductors 688, 794, 796 through antijackpot relay solenoid 792 to the other side of the power source via conductor 798 and 616. When the antijackpot relay solenoid 792 is energized, antijackpot relay switch 628 is opened and antijackpot relay switch 800 is closed. When switch 628 opens, the timer motor 622 circuit is broken, and the timer motor stops. At the same time relay switch 800 closes and completes a circuit across sold-out indicator 802 via conductors 606, 804, 806, 808, 740 and 616. This stops any further vending from the machine until the defective circuit is repaired and warns the purchasers against depositing further coins in the machine.

If, as is the usual case, the vending circuit is not defective the closing of the antijackpot relay switch 646 with contact 790 has no effect. The timer motor continues to rotate the switch cam shaft until the completion of one revolution at which point timer motor cycle switch 640 moves to its original position in contact with switch pole 680, thus breaking the timer motor circuit through switch pole 682 and stopping the timer motor. The coin lock coil 670 is then again energized and the machine is ready to accept another coin to begin another vending cycle.

The blower motor 127 operates continuously so long as waste tank relay switch 468 is closed. This motor drives the blower in blower housing 126 to remove humid air in the vending machine cabinet and is connected across the lines 600 and 401 through conductors 660 and 764.

Test switch 26, when closed manually, starts a vending cycle in the same manner as coin operated switch 602, and is used to test the machine when it is serviced.

Figure 2:
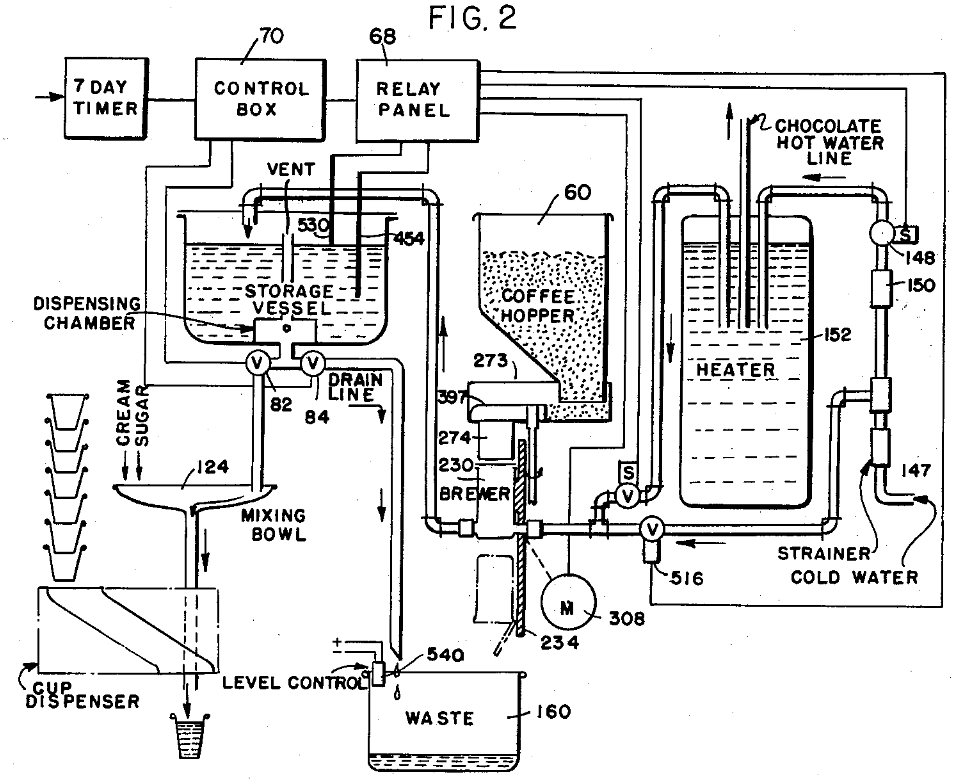
FIG. 2 is a diagrammatic view of the major components of the vending machine.
Figure 3:
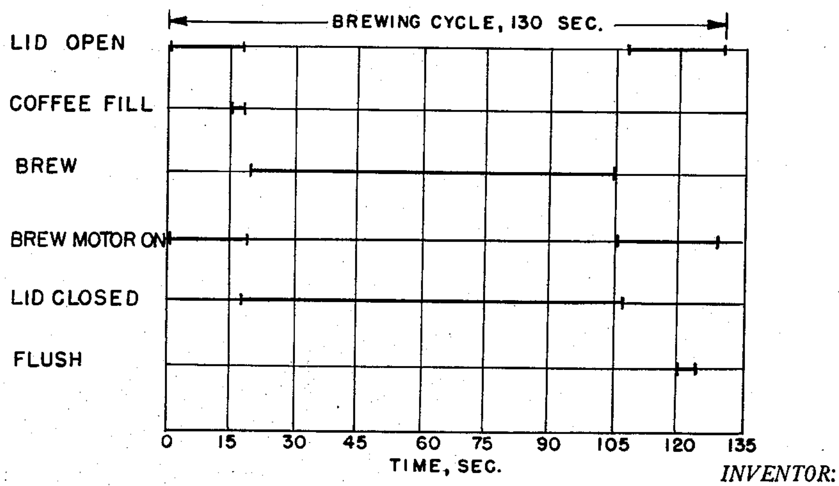
FIG. 3 is a graphic representation of the time sequences of the various steps during the coffee brewing cycle.

It will be noted in FIG. 2 that the storage vessel in a preferred embodiment of the invention contains a small separate dispensing chamber mounted about the discharge line for the storage vessel. This dispensing chamber is employed for several reasons: (1) the maintenance of a substantially average head during the dispensing interval regardless of the liquid level in the storage vessel, and (2) provision for adequate mixing of the coffee in the storage vessel by acting in the nature of a baffle. The dispensing chamber is provided with a central vent tube and has one or a small number of apertures connecting the dispensing chamber with the storage chamber. These apertures should be small enough to provide a substantial pressure drop thereacross during fluid flow from the storage vessel to the dispensing chamber. The total area of the apertures with relation to the smallest effective area constricting fluid flow out of the dispensing chamber into the vending line is critical with reference to the maintenance of a substantially uniform average head during the dispensing interval. The smallest cross-section of the discharge line from the dispensing chamber should be substantially greater than the total area of the apertures so that the rate of discharge from the dispensing chamber is substantially greater than the rate of flow of liquid from the storage chamber into the dispensing chamber. The ratio of the smallest effective area constricting fluid flow from the dispensing chamber to the total area of the apertures connecting the storage chamber and the dispensing chamber should be at least about 2.5:1, respectively. In vending machines for dispensing coffee, a ratio in the range of about 2.5:1 to 3:1 is satisfactory.

The volume capacity of the discharge chamber is preferably of a size slightly larger than the volume of liquid to be dispersed into the cup. For example, in dispensing approximately six ounces of coffee, the dispensing chamber capacity is preferably about 8 ounces.

When the vending valve 82 is opened, the coffee drains from the dispensing chamber into the discharge line. The air vent, permits its evacuation. A relatively small quantity of coffee, compared to the volume discharged from the dispensing chamber, enters the dispensing chamber through the apertures by gravitational flow during the discharge cycle. The pressure head provided by the coffee in the storage chamber has only a slight effect on the average head of the coffee in the dispensing chamber because there is a relatively high pressure drop as the liquid passes through small apertures into the dispensing chamber. Thus, the average head in the liquid being discharged from the dispensing chamber is substantially independent of the liquid level in the storage chamber.

This feature of the vending machines of the present invention is described in greater detail in my copending application Serial No. 633,798, filed January 11, 1957, now U.S. Patent No. 2,935,236, issued May 3, 1960, the disclosure of which is incorporated herein by reference.

It will be understood that the embodiment of the invention heretofore described in detail in conjunction with the drawings is merely illustrative, and that the inventive concept is susceptible of various other modifications and embodiments without departing from the spirit of the invention or the scope of the appended claims.

The invention is hereby claimed as follows:

1. In a coffee vending machine, means for automatically brewing coffee comprising a rotatably mounted brewing vessel having a closure hingedly mounted thereon; means for rotating said vessel about a horizontal axis; means for automatically filling said vessel with a metered amount of ground coffee; means for keeping the closure open during the filling period; means for circulating hot water for a predetermined time through said vessel after it is filled with a metered amount of ground coffee; means for locking the closure in fluid-tight contact with said vessel during the brewing cycle and for releasing the closure when the vessel is inverted during rotation thereof to discharge the coffee grounds; water supply line connected to said brewing vessel; and a pressure regulator valve in the water supply line for maintaining the flow of said hot water at a substantially constant rate.

2. In a coffee vending machine, means for automatically brewing coffee comprising apparatus mounted for rotation about a horizontal axis and including coffee brewing vessel having a closure hingedly mounted thereon; means controlled by an electrical control circuit for rotating said vessel; a ground coffee hopper; means for automatically filling said vessel with a metered amount of ground coffee as it rotates; means for holding the closure in open position during the filling period; switch means operable by said rotatable apparatus for stopping rotation of said vessel after it is filled with ground coffee; means for locking the closure in fluid-tight contact with said vessel during the brewing cycle and for releasing the closure when the vessel is inverted during rotation thereof to discharge the coffee grounds; means for circulating hot water through said closed vessel after it is stopped; means for continuing rotation of said vessel after the circulation of hot water through said vessel has stopped; a single storage pot for storing coffee brewed by said first mentioned means; a conduit connecting said vessel and said pot for transferring brewed coffee to said storage pot from said brewing vessel; electrode means in said storage pot and connected in said electrical control circuit for initiating rotation of said vessel when the liquid level in said storage pot falls below said electrode; flow control means for maintaining the flow of hot water to said coffee brewing vessel at a substantially constant rate; and timer means for stopping flow of said hot water to said coffee brewing vessel after a predetermined time.

3. In a coffee vending machine, means for automatically brewing coffee comprising a rotatably mounted coffee brewing vessel haivng a closure hingedly mounted thereon; means for rotating said vessel about the horizontal axis; means for automatically filling said vessel with a metered amount of ground coffee as it rotates; means for holding the closure open during the filling period; means for stopping rotation of said vessel after it is filled with the metered amount of ground coffee; means for circulating hot water through said vessel for a predetermined time after it is stopped; means for locking the closure in fluid-tight contact with said vessel during the brewing cycle and for releasing the closure when the vessel is inverted during rotation thereof to discharge the coffee grounds; flow control means for maintaining the flow of said hot water at a substantially constant rate; timer means for stopping flow of said hot water; and means for continuing rotation of said vessel after the circulation of hot water through said vessel has stopped.

4. In a coffee vending machine, means for automatically brewing small quantities of coffee by infusion of hot water through a bed of ground coffee; a single storage vessel for storing said brewed coffee; means for transferring brewed coffee during the brewing cycle from said first-mentioned means to said storage vessel; an electrode in said storage vessel with an electrode circuit completed through the coffee in said storage vessel; electrical means responsive upon opening of said electrode circuit for initiating operation of said first-mentioned means when the coffee in said storage vessel falls below a predetermined level wherein the electrode circuit is open; timer means for stopping the operation of said first-mentioned means at a predetermined time; and means for deactivating said electrode circuit during the brewing cycle of said first-mentioned means.

5. The combination of claim 4 wherein the first-mentioned means and the electrode are connected by an electrical circuit through the secondary of a transformer, one side of said secondary being grounded, a solenoid relay having one side of the solenoid grounded, conductor means connecting the ungrounded side of said secondary and said electrode through a switch in said relay; conductor means with a capacitor therein connecting the ungrounded side of said secondary and said solenoid; and the storage vessel being grounded.

6. The combination of claim 5 wherein the capacitor has a reactance substantially equal to the inductance of said solenoid in said relay.

7. In a coffee vending machine, means for automatically brewing small quantities of coffee by infusion of hot water through a bed of ground coffee; a single storage vessel for storing said brewed coffee; means for transferring brewed coffee during the brewing cycle from said first-mentioned means to said storage vessel; liquid level control means in said storage vessel consisting of a single electrode with an associated electrode circuit completed through the coffee in said storage vessel; electrical means responsive, upon opening of said electrode circuit for initiating operation of said first-mentioned means when the coffee in said storage vessel falls below a predetermined level wherein the electrode circuit is open; timer means for stopping the operation of said first-mentioned means at a predetermined time; and means for deactivating said electrode circuit during the brewing cycle of said first-mentioned means.

8. A coffee vending machine comprising: a coffee storage pot; coin-actuated switch means; means responsive to actuation of said switch means for dispensing a small quantity of coffee from said storage pot; a rotatable coffee brewing vessel mounted for rotation about a horizontal axis; means providing for automatically brewing coffee therein by passing hot water through the coffee grounds in said brewing vessel; a conduit connecting said brewing vessel and said storage pot for transferring coffee from said brewing vessel to said storage pot; means associated with electrode means in said storage pot for actuating said means providing for automatically brewing coffee when the coffee in said storage pot falls below a predetermined level and a timer means for stopping flow of hot water to said brewing vessel after a predetermined time.

9. A coffee vending machine comprising: a coffee storage pot; coin-actuated switch means; means responsive to actuation of said switch means for dispensing a small quantity of coffee from said storage pot; a rotatable coffee brewing vessel mounted for rotation about a horizontal axis and having means associated therewith for performing the functions of filling said vessel with a measured amount of ground coffee, brewing coffee therein by passing hot water through the coffee grounds in said vessel and discharging the coffee grounds and rinsing said vessel during one revolution thereof; a conduit connecting said brewing vessel and said storage pot for transferring brewed coffee from said brewing vessel to said storage pot; means associated with electrode means in said storage pot for initiating rotation of said brewing vessel when the coffee in said storage pot falls below said electrode; and a timer means for stopping flow of hot water to said brewing vessel after a predetermined brewing cycle time.

References Cited in the file of this patent

UNITED STATES PATENTS

| | | |
|---|---|---|
| 1,668,540 | McAllen | May 1, 1928 |
| 1,805,159 | Bauer et al. | May 12, 1931 |
| 2,014,325 | Grilli | Sept. 10, 1935 |
| 2,149,270 | Burgess | Mar. 7, 1939 |
| 2,154,845 | Hegwein | Apr. 18, 1939 |
| 2,517,073 | Alvarez | Aug. 1, 1950 |
| 2,592,761 | Sevendsgaard | Apr. 15, 1952 |
| 2,639,078 | Karlen | May 19, 1953 |
| 2,644,478 | Calabrese | July 7, 1953 |
| 2,706,444 | Chaplik | Apr. 19, 1955 |
| 2,718,843 | Jones | Sept. 27, 1955 |
| 2,734,658 | Poitras | Feb. 14, 1956 |
| 2,761,200 | Arnett | Sept. 4, 1956 |
| 2,830,528 | Arnett | Apr. 15, 1958 |